United States Patent [19]

Burroughs et al.

[11] Patent Number: 5,926,006

[45] Date of Patent: Jul. 20, 1999

[54] MODULAR ELECTRONIC APPARATUS WITH BATTERY CHARGING CONTROL

[75] Inventors: Chester Robert Burroughs; Brian Ashley Carpenter, both of Cary; Gary Ernest O'Neil; Russell Alan Resnick, both of Raleigh, all of N.C.

[73] Assignee: International Business Machines Corporation, Armonk, N.Y.

[21] Appl. No.: 08/963,475

[22] Filed: Nov. 3, 1997

[51] Int. Cl.[6] ................................................ H01M 10/46
[52] U.S. Cl. .......................................... 320/114; 320/115
[58] Field of Search .................................... 320/107, 110, 320/112, 113, 114, 115, FOR 101, FOR 102, DIG. 35, DIG. 36

[56] References Cited

U.S. PATENT DOCUMENTS

| | | | |
|---|---|---|---|
| 4,419,616 | 12/1983 | Baskins et al. | 320/115 |
| 5,052,943 | 10/1991 | Davis | 320/115 X |
| 5,337,405 | 8/1994 | Lindauer et al. | 395/147 |
| 5,465,038 | 11/1995 | Register | 320/115 X |
| 5,659,236 | 8/1997 | Hahn | 320/115 X |

*Primary Examiner*—Edward H. Tso
*Attorney, Agent, or Firm*—Daniel E. McConnell; George E. Grosser

[57] ABSTRACT

A modular electronic apparatus, in particular a mobile client system, in which a fully functional handheld computing system can be selectively integrated with a fully functional handheld communications system. Each system is provided with battery supported power supply, to enable the separate functionality of each system, and a particular cooperation between the power supplies of the two systems, when integrated, is achieved. Optimization of the battery supported power supplies for two systems (here, the computer and communications systems) is thus achieved, while accommodating the integrated use of the systems.

10 Claims, 9 Drawing Sheets

MODULAR ELECTRONIC APPARATUS WITH BATTERY CHARGING CONTROL

RELATED APPLICATIONS

This application is one of a series of related applications assigned to common ownership. Other applications in the series include:

application Ser. No. 08/781,004 filed Jan. 9, 1997, entitled "Mobile Client Computer with Keyboard Interface" with named inventors T. Aebli, B. Miller and W. W. Vetter;

application Ser. No. 08/703,171 filed Aug. 22, 1996, entitled "Mobile Client Computer Programmed to Predict Input" with named inventors R. L. Bertram, D. F. Champion and P. Brittenham;

application Ser. No. 08/708,168 filed Aug. 22, 1996, entitled "Mobile Client Computer Programmed to Exchange Lists of Predicted Input" with named inventors R. L. Bertram and W. T. Oldfield;

application Ser. No. 08/814,034 filed Mar. 10, 1997, entitled "Mobile Client Computer Interacting with Docking Device" with named inventors E. H. Booth, B. A. Carpenter, R. B. Ferrier, R. A. Resnick and W. W. Vetter;

application Ser. No. 08/706,990 filed Aug. 22, 1996, entitled "Mobile Client Computer Programmed to Copy Lists of Predicted Input" with named inventors R. L. Bertram, P. J. Brittenham and D. F. Champion;

application Ser. No. 08/813,148 filed Mar. 7, 1997, entitled "Mobile Client Computer Programmed for Systems Message Display" with named inventors R. L. Bertram and D. F. Champion;

application Ser. No. *filed*, entitled "Mobile Client Computer Programmed with Browser Function" with named inventors R. L. Bertram and D. F. Champion;

application Ser. No. 08/813,522 filed Mar. 7, 1997, entitled "Mobile Client Computer Programmed to Process Table Displays" with named inventor R. L. Bertram;

application Ser. No. 08/807,969 filed Mar. 3, 1997, entitled "Mobile Client Computer Programmed to Combine Cursor, Control and Input Functions" with named inventors P. J. Brittenham and L. D. Comerford;

application Ser. No. 08/813,527 filed Mar. 7, 1997, entitled "Mobile Client Computer Programmed to Display Drop Down Scrolling Indicator" with named inventors R. L. Bertram and D. F. Champion;

application Ser. No. 08/813,521 filed Mar. 7, 1997, entitled "Mobile Client Computer Programmed to Hide Empty Table Elements" with named inventor R. L. Bertram; and application Ser. No. 08/700,608 filed Aug. 12, 1996, entitled "Mobile Client Computer Programmed to Display Hexagonal Keyboard" with named inventors R. L. Bertram, D. F. Champion and L. S. Eichorn.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free to the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

SUMMARY OF THE INVENTION

With the foregoing as background, the present invention contemplates a modular electronic apparatus, in particular a mobile client system, in which a fully functional handheld computing system can be selectively integrated with a fully functional handheld communications system. Each system is provided with battery supported power supply, to enable the separate functionality of each system, and the present invention contemplates a particular cooperation between the power supplies of the two systems when integrated.

It is a purpose of the present subject invention to permit optimization of the battery supported power supplies for two systems (here, the computer and communications systems) while accommodating the integrated use of the systems. In particular, this purpose is accomplished while simplifying the charging implementation for the two, separately optimized, power supplies.

BRIEF DESCRIPTION OF THE DRAWINGS

Some of the purposes of the invention having been stated, others will appear as the following description proceeds, when taken in connection with the accompanying drawings, in which.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
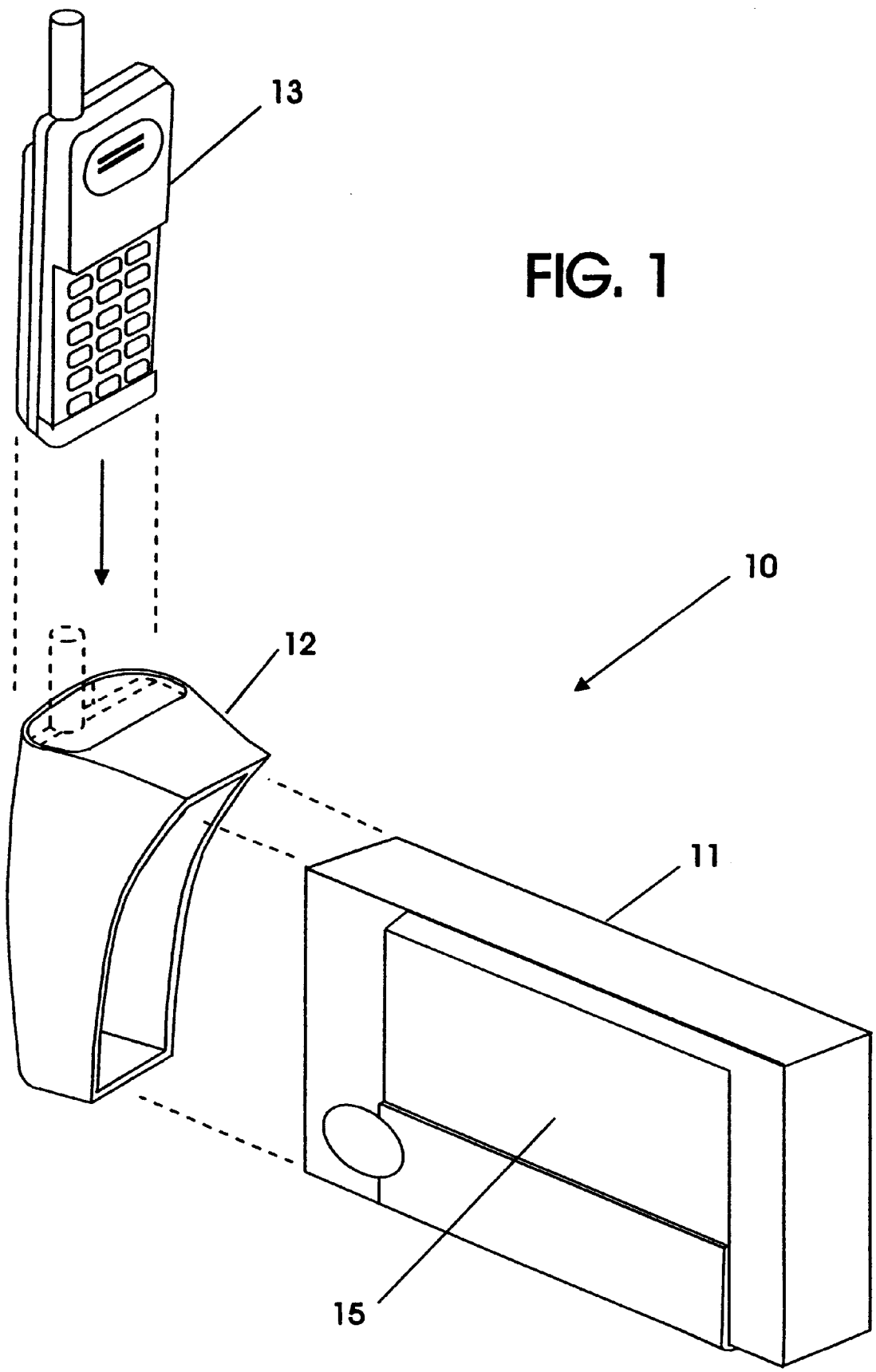
FIG. 1 is an exploded perspective view of certain elements of a mobile client computer system in accordance with this invention.
Figure 2:
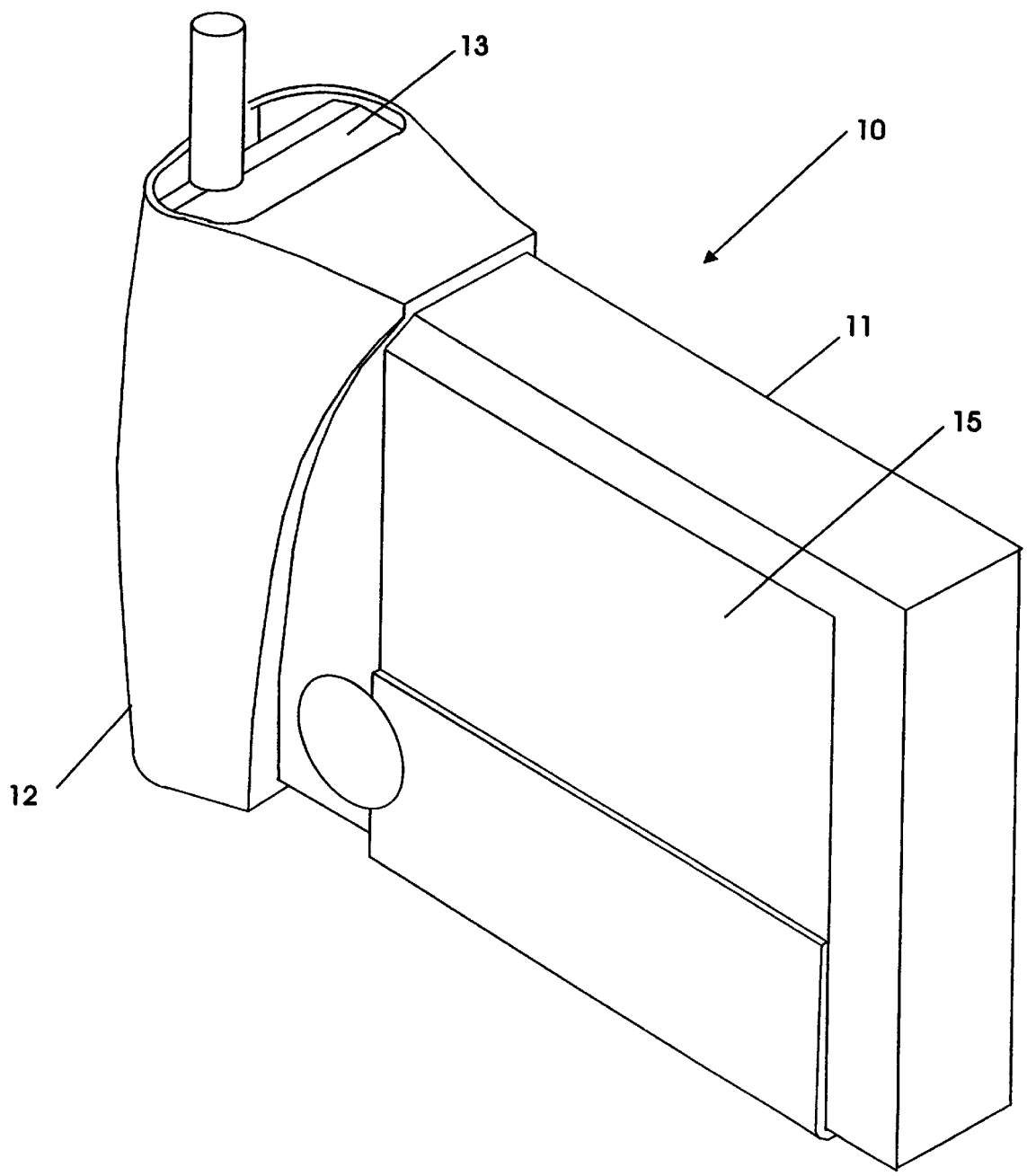
FIG. 2 is a perspective view of the mobile client system of FIG. 1 as assembled for use.

Referring now more particularly to accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least date, possibly both date and audio such as voice, between the mobile client system and supporting servers and mainframes, In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

As herein described, the tablet element will sometimes be referred to as the host system which, as described hereinafter, has its own power supply including a battery for supporting full functionality of the tablet as a handheld computer system. The transceiver element will sometimes be referred to as the holster peripheral, that is as a peripheral element to the host system which connects with the host system through the holster. The transceiver element has its own power supply including a battery for supporting full functionality of the transceiver as a handheld communications system.

For purposes of discussion in this description, the following terms, when used, will have the indicated meanings:

Holster—Mechanical housing and electrical interface for a self-powered peripheral, removable or non-removable.

Holster Peripheral—Self-contained, battery powered electronic device, which could be communications, data storage, or other function.

Host—Computer attached to the holster, with electrical and software interfaces to the holster peripheral.

Host Battery—Battery contained in the host, separate from the holster peripheral battery.

Peripheral Battery—Battery in the holster peripheral.

Host Charge Controller—Battery charging electronics for the host battery.

Holster Electronics—Electronics to control power and battery management for the holster peripheral.

An advantage realizable with the tripartite organization is the ready substitution of one radio transceiver for another. More particularly, while digital data and analog audio can be exchanged over a cellular telephone radio interface, with data using cellular digital packet data (CPDP) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

While described herein with particular reference to the transceiver/holster/tablet combination, the knowledgeable reader will recognize that the power supply technology here described is applicable to other configurations of a host system and holster peripheral system. Indeed, the present invention is valuable in any instance where both integration and separate operation of two disparate systems having separate power supplies with each with battery support is desired.

Figure 3:
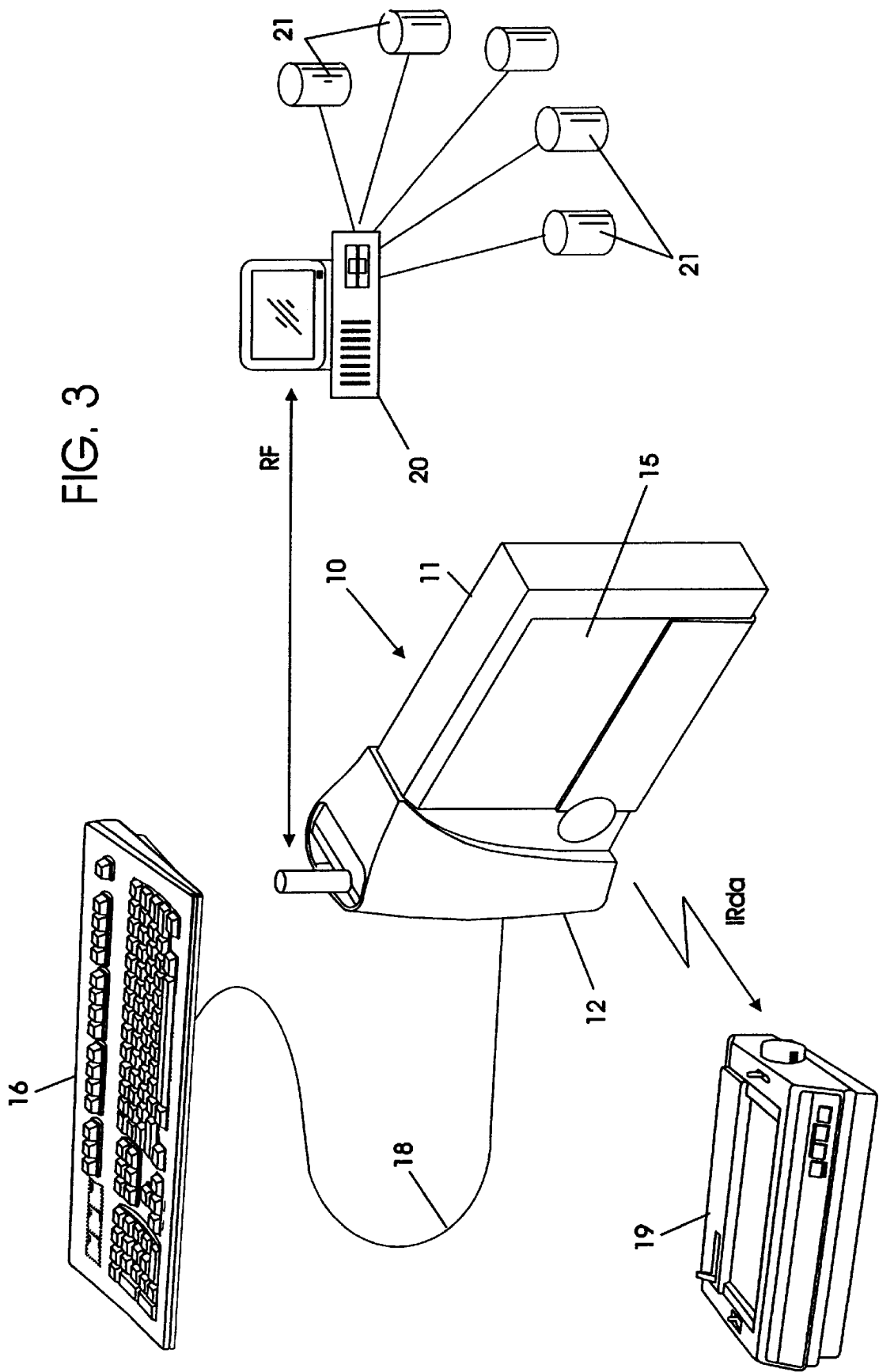
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
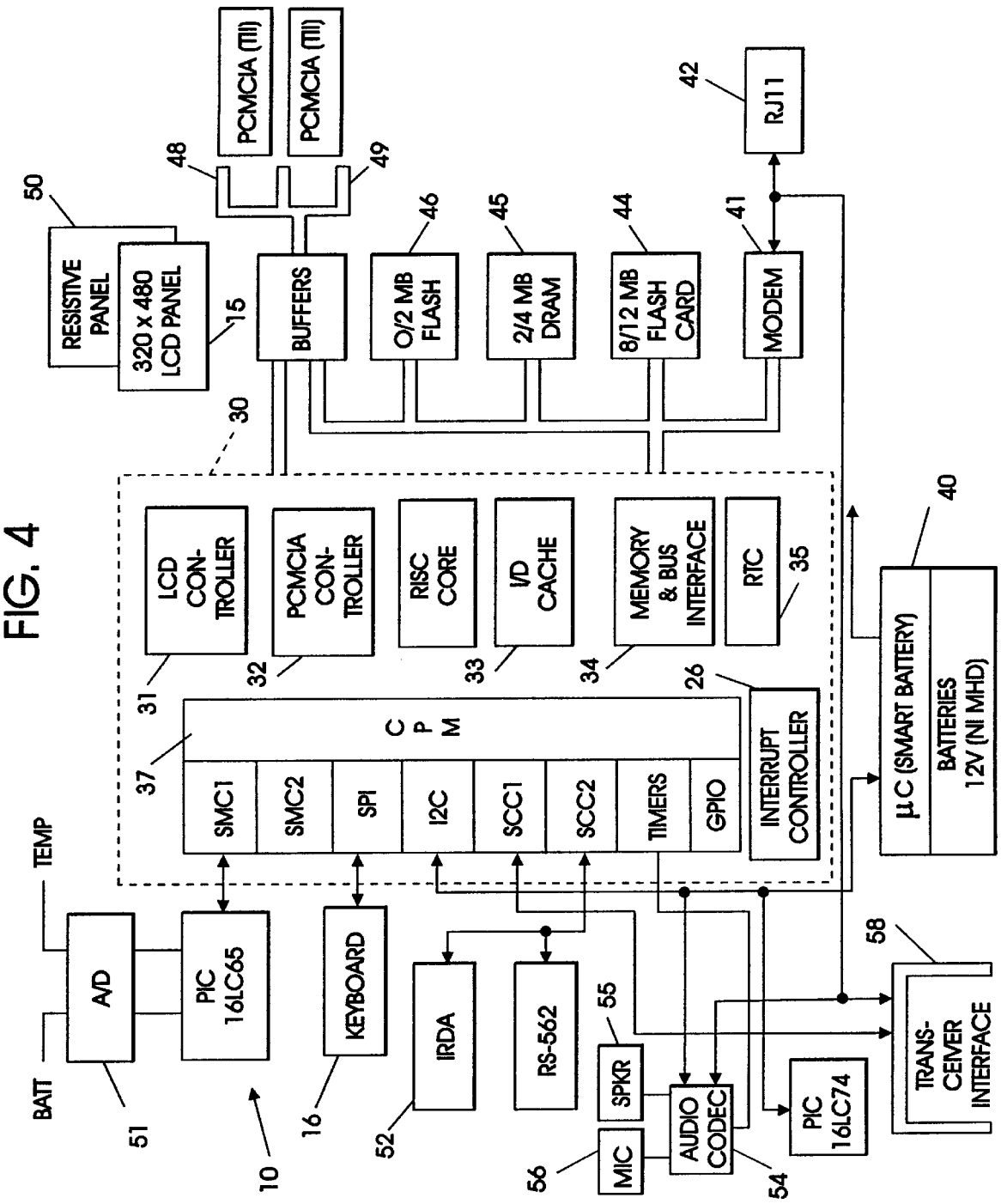
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics. The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44; by dynamic random access memory (DRAM) 45; and by core flash memory 46. Preferably, a pair of PCMCIA slots, of type II, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
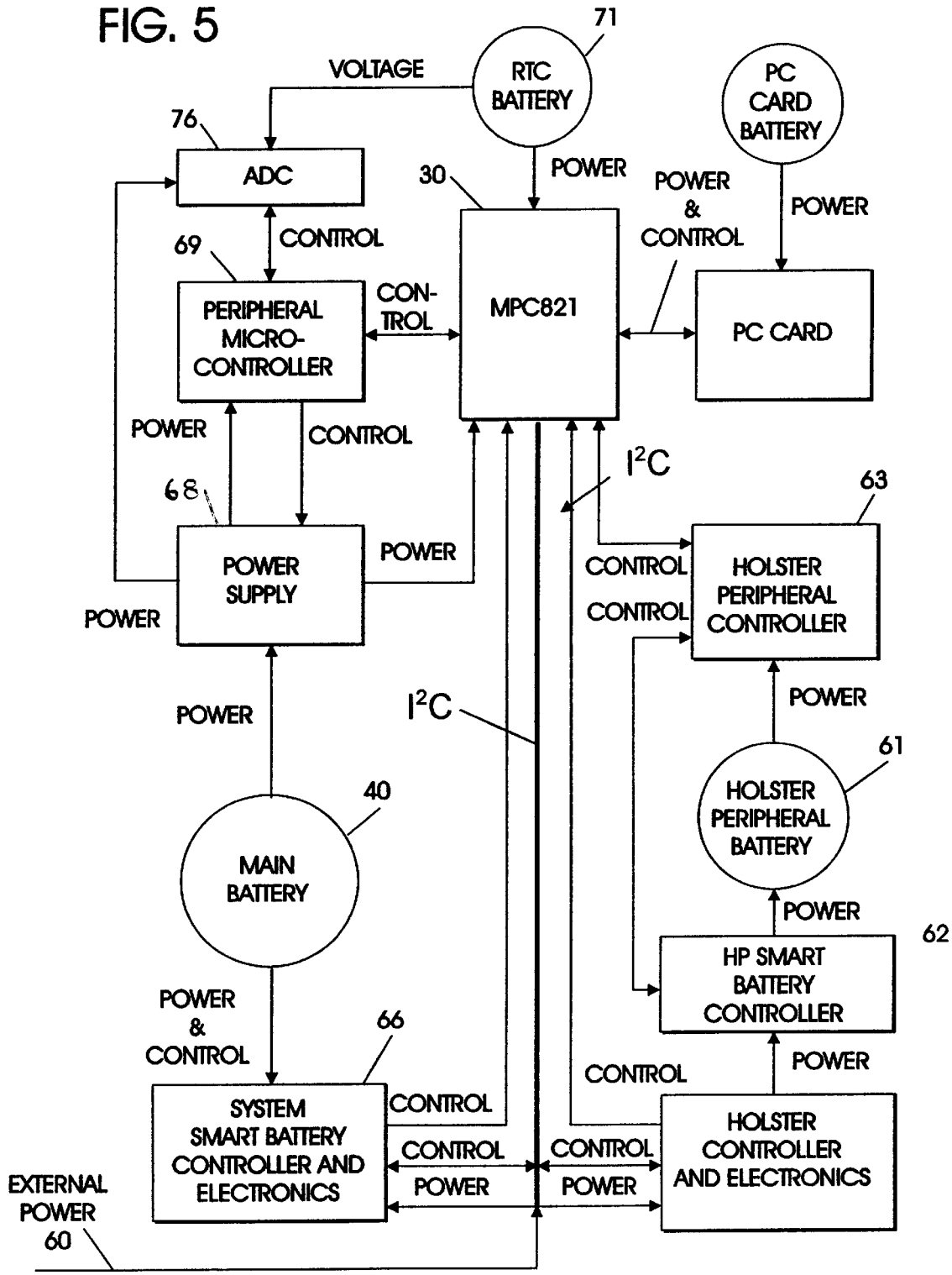
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
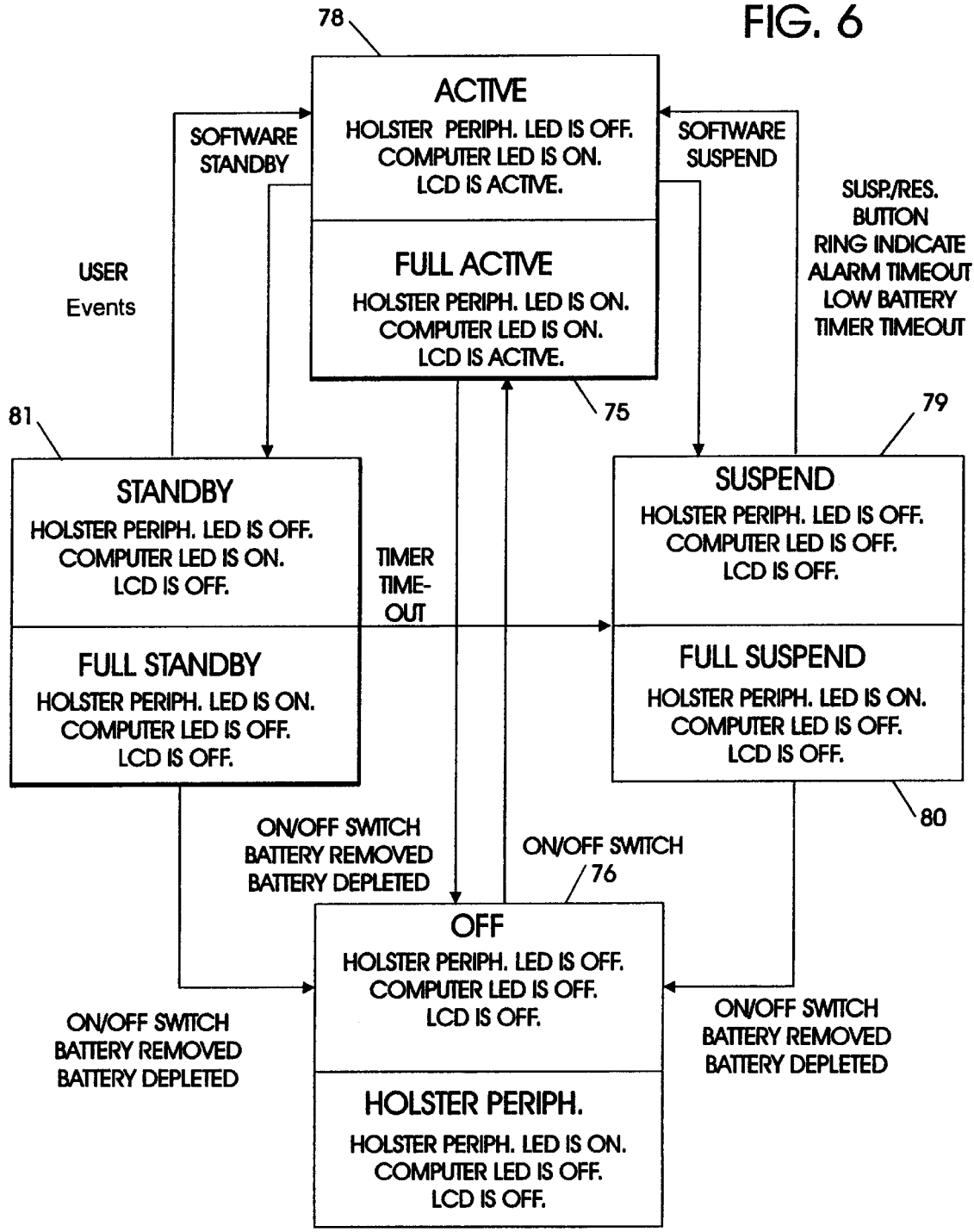
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
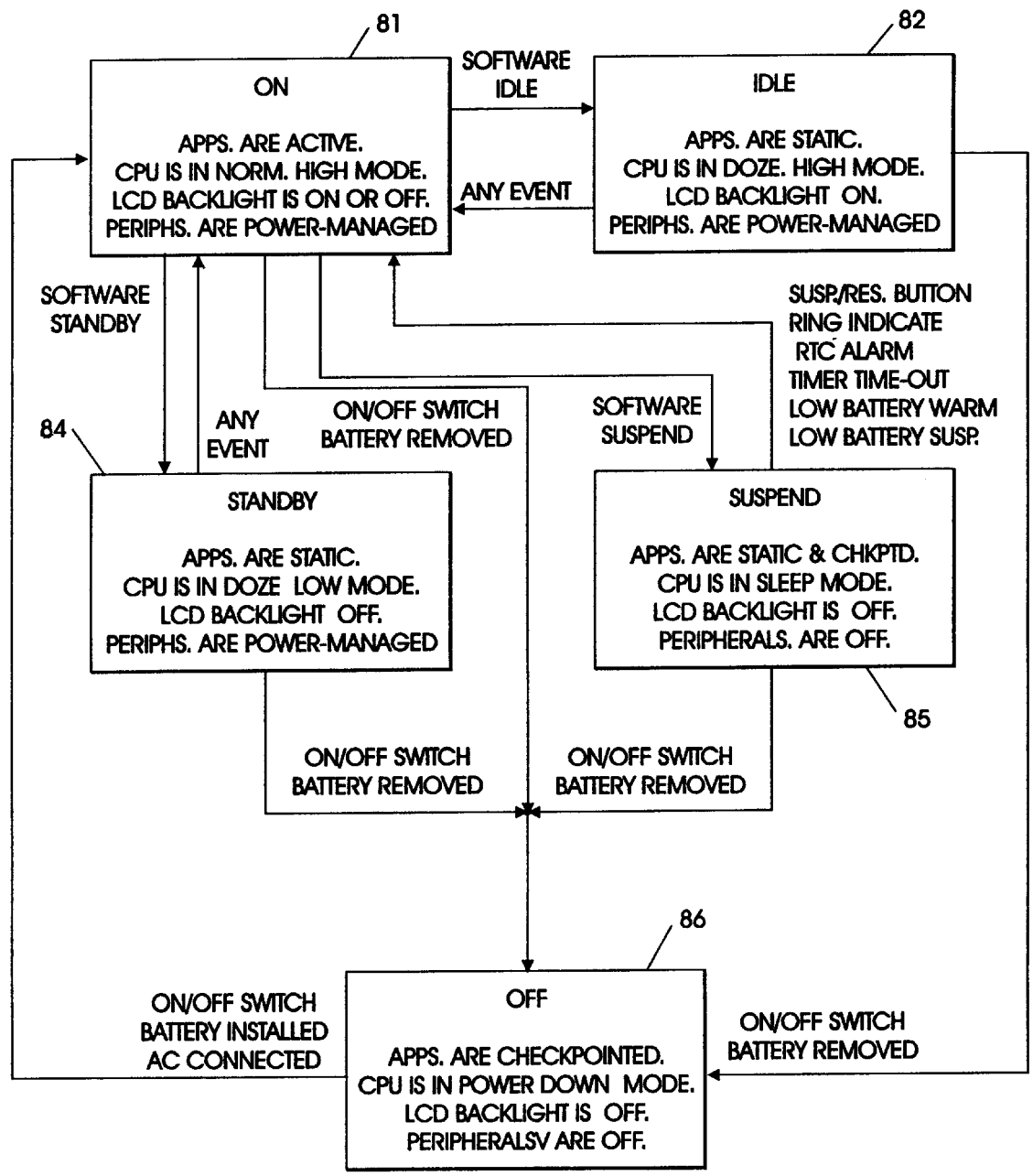
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

Figure 8:
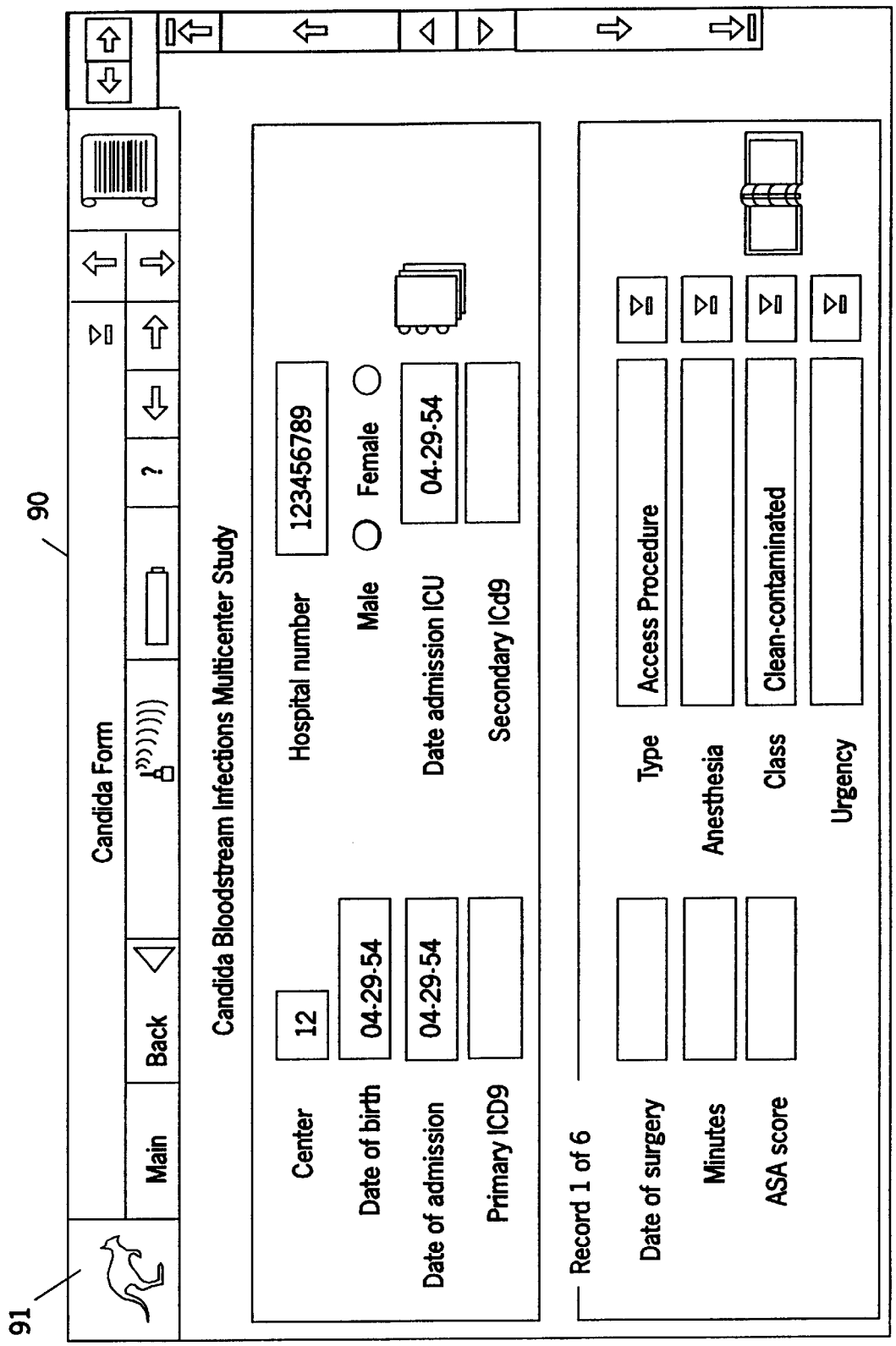
FIG. 8 is an illustration of the display screen of the mobile client of FIG. 2 while driven by the execution of an application program on the mobile client to display certain data.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Figure 9:
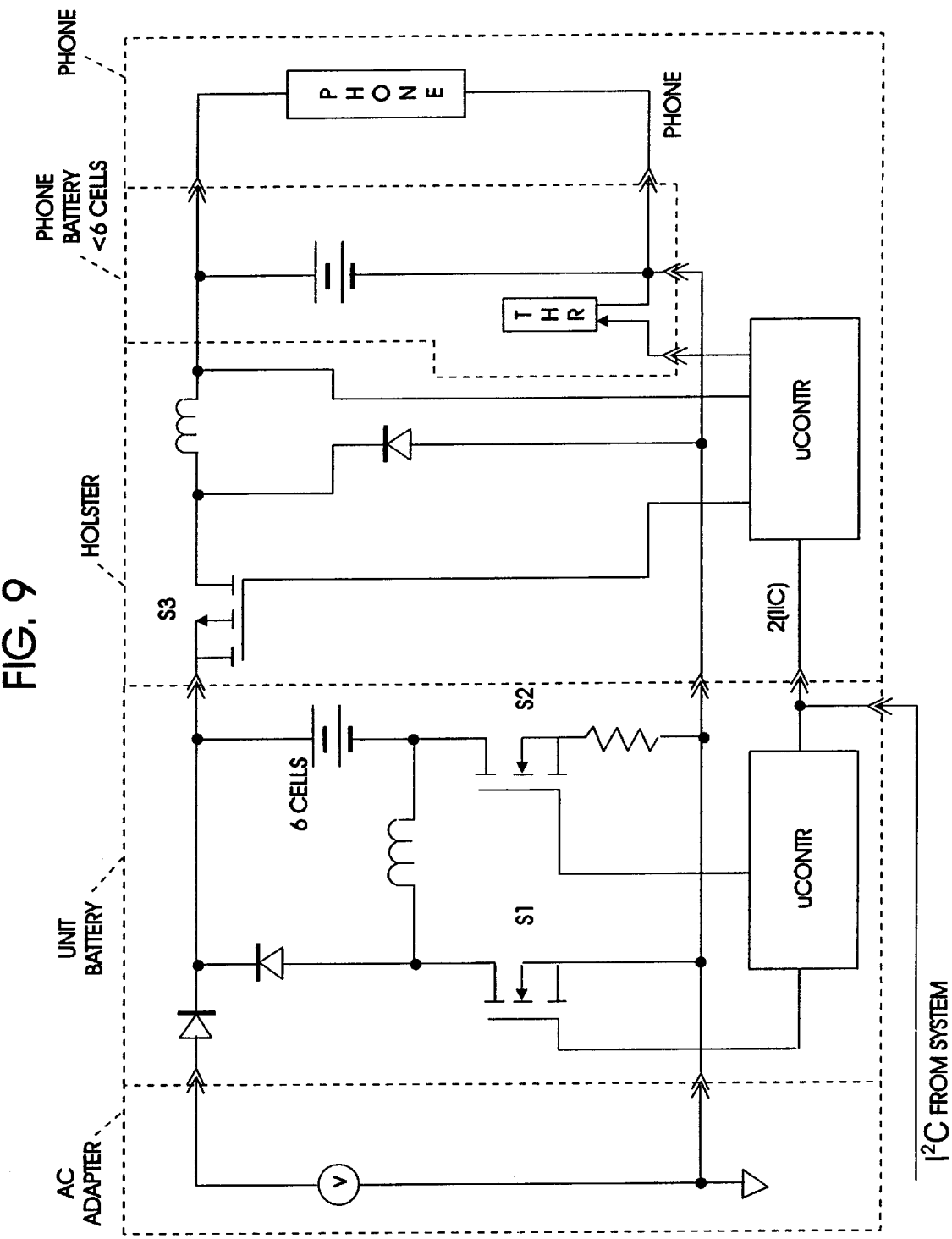
FIG. 9 is an illustration of power supply and battery charging circuitry for the elements of the mobile client of the preceding Figures.

Turning now to FIG. 9 and the power supply circuitry there shown, it is to be understood that the systems described to this point can be operated from an outside current source (such as available utility power lines) or from batteries provided as part of the systems. Further, the power supply circuitry provides for certain coordination among the systems in order to maintain and use to advantage the system capabilities for independent as well as integrated operation. The power supply circuitry, while operating from utility mains, supports variable rate charging of either or both battery packs based on such variables as AC adapter power limitations, Host power usage, State-of-charge of both batteries, and User preferences and priorities. When operating from the available battery power sources, the holster peripheral may run off of its own battery or the host battery can power the holster peripheral under system control. In some instances, the holster peripheral battery could be used to power the host.

In FIG. 9, an external power source is indicated at 100, and may take the form of an adapter coupleable with utility mains, an automobile power outlet or the like. The adapter 100 supplies a known voltage to a host power supply which is indicated at 101 and includes a battery 102 having a appropriate number of cells, a microcontroller 104, and a pair of field effect transistors ("FETs") here used as switching devices S1 and S2, along with appropriate diodes, inductors, etc. as known to power supply designers. The host power supply 101 is housed within the tablet 11. The holster 12 houses a microcontroller 105, a FET switch S3, and associated circuit elements. The holster peripheral 13 houses a battery 106 and a monitoring thermistor 108. The microcontrollers 104, 105 cooperate, as described hereinafter, in achieving a particularly desirable operation for the power supply of this invention.

The power supply circuitry is independent of characteristics such as battery chemistry, capacity or number of cells. Although the holster electronics could be designed for a specific holster peripheral as a cost saving measure, in general this is not required. The battery subsystem shown in FIG. 9 is designed for a specific application. Generalization requires either a method for providing battery specific data to the holster electronics, which can be done through one of the systems or via ROM in the holster peripheral battery itself, or circuit elements which support the flow of energy from the holster peripherial as well as to it. The battery packs used will have appropriate safety features, as well as an intelligent interface, such as by way of a serial port, to the host. Each interface has certain minimum requirements, as follows:

Between the adapter 100 and the host power supply 101:

| Pin | Signal | Function |
| --- | --- | --- |
| 1 | +Vdc | Adapter input |
| 2 | Battery voltage | Output to system |
| 3-N (As required) | System data interface | Data input/output |
| Last | Ground | System ground |

Between the host power supply 101 and the holster 12 circuitry:

| Pin | Signal | Function |
| --- | --- | --- |
| 1 | Battery voltage | Input from system |
| 2-N (As required) | System data interface | Data input/output |
| Next | Holster peripheral voltage | Output to holster peripheral |
| Last | Ground | System ground |

In ageneral case, Pin 1 and Pin Next could become an output and an input, respectively.

Between the holster 12 circuitry and the peripheral 13 circuitry:

| Pin | Signal | Function |
|-----|--------|----------|
| 1 | Holster peripheral Voltage | Input from holster circuitry |
| 2 | Holster peripheral Temperature | Output from holster peripheral |
| 3 | Ground | System ground |

The power supply circuitry of this invention provides an ability to power the holster peripheral by duty cycle modulating S3, or to have the peripheral self-powered by opening S3. The choice between these operating modes is software controlled by the host computer over the system data interface.

Upon a holster peripheral wake-up event (such as inserting a peripheral) or system command for holster operation, the holster electronics performs the following functions:

1. Acknowledges the event to the system via the system data interface.
2. Checks the battery voltage and temperature of the holster peripheral and reports it to the system.
3. Responds to other host queries and commands, examples are:
   a. Holster identification, and
   b. Holster power on/off.

Upon a holster peripheral power-up command for holster peripheral operation, the holster electronics performs the following functions:

1. Acknowledges the event to the host.
2. Determines holster peripheral battery health.
3. Reports errors (shorted/open cells/temperature) or "OK" status to host.
4. Checks for external power (result=no, else branch to next paragraph).
5. Upon command, applies power to the holster peripheral, limiting the voltage to the voltage seen during the battery health check, and current to the holster peripheral specified maximum.

Maintaining the initial voltage is an important feature of this invention. This ensures that the holster peripheral battery is not charged by the host battery, which would needlessly drain the host. This feature also allows the use of existing battery packs, as otherwise a switch must be added to a "standard" battery pack to isolate the host battery from the holster peripheral, adding both development and recurring cost. This approach also improves the quality of power seen by the holster peripheral because transient loads from the holster peripheral are sourced from both the holster electronics and the holster peripheral battery. A transient may cause the holster peripheral battery voltage to fall somewhat during the transient: however, since the holster electronics maintains the initial voltage, the holster peripheral battery is recharged between transients. Thus, the average power drawn from the host battery is the same, but the holster peripheral battery acts as a large capacitor to smooth transients seen by the system.

The approach also allows a system with a dead holster peripheral battery to be used (certainly for nickel-based batteries) by setting a minimum voltage level for the holster peripheral. If the initial voltage of the holster peripheral battery is below the operational level of the holster peripheral battery, passing a small amount of current through it causes the voltage to rise into the operational range. Ideally, this operation would be performed with user input. That is, the holster peripheral would read the voltage, check for open/shorts (assume ok) and report the battery as dead. The host would inform the user of the condition, and ask if the holster peripheral is to be used anyway, as this will result in some degradation in host battery life. Depending on the state of the host battery, and the urgency of the task, the user can decide how to proceed.

The response to a holster peripheral power-up command is the same as above, except that instead of limiting the output voltage and current to operational levels, the holster begins the charging algorithm.

The holster peripheral charging routine details depend on the characteristics of the holster peripheral battery. Charging occurs automatically upon application of external power, and the general approach is:

1. Current is provided at an appropriate rate for the holster peripheral battery.
2. Voltage and temperature are continuously monitored.
3. Fast charge shall terminate under conditions appropriate for the holster peripheral battery life. Charge termination is reported to the host.

Upon termination of charge, the holster electronics maintains the output voltage at a predetermined level, and the current limit returns to the holster peripheral maximum.

In the drawings and specifications there has been set forth a preferred embodiment of the invention and, although specific terms are used, the description thus given uses terminology in a generic and descriptive sense only and not for purposes of limitation.

What is claimed is:

1. An electronic apparatus comprising:
   a host;
   a host power supply having a host battery and circuitry controlling battery charging and discharging, said circuitry including a host microcontroller;
   a holster coupleable with said host;
   a holster power manager having circuitry controlling electrical power distribution, said circuitry including a holster microcontroller;
   said host microcontroller and said holster microcontroller communicating one with the other and cooperating in controlling electrical power and load distribution while said host and said holster are coupled;
   a holster peripheral coupleable with said holster;
   a holster peripheral power supply having a peripheral battery and monitor circuitry monitoring the state of said peripheral battery;
   said holster microcontroller communicating with said monitoring circuitry while said holster and said holster peripheral are coupled and deriving from said monitor circuitry while coupled thereto an input indicative of characteristics of the peripheral battery: and
   microcontroller logic, operative in said host and holster microcontroller, to control power flow among the host, holster and holster peripheral in accordance with said characteristics.

2. Apparatus according to claim 1 wherein said said host power supply circuitry further includes a switch device responsive to said host microcontroller and to the presence of an external electrical power supply for selectively controlling the application of voltage derived from said external power supply to said host battery.

3. Apparatus according to claim 1 wherein said holster power manager further includes a switch device responsive to said holster microcontroller for selectively controlling the application of voltage derived from said host battery to said peripheral battery.

4. Apparatus according to claim 1 wherein said host is a mobile client computer system.

5. Apparatus according to claim 1 wherein said holster peripheral is a radio transceiver and wherein said information includes the type and voltage level of the battery of the holster peripheral, which voltage level is maintained at its initial level under control of the microprocessor logic in the coupled system.

6. A computer system comprising:

a tablet;

a tablet power supply having a tablet battery and circuitry controlling battery charging and discharging, said circuitry including a tablet microcontroller;

a holster coupleable with said tablet;

a holster power manager having circuitry controlling electrical power distribution, said circuitry including a holster microcontroller;

said tablet microcontroller and said holster microcontroller communicating one with the other and cooperating in controlling electrical power and load distribution while said tablet and said holster are coupled;

a holster peripheral coupleable with said holster; and a holster peripheral power supply having a peripheral battery and monitor circuitry monitoring the state of said peripheral battery;

said holster microcontroller communicating with said monitoring circuitry while said holster and said holster peripheral are coupled and deriving from said monitoring circuitry while coupled thereto an input indicative of characteristics of the peripheral battery: and microcontroller logic, operative in said host and holster microcontroller, to control power flow among the host, holster and holster peripheral in accordance with said characteristics.

7. A computer system according to claim 6 wherein said said tablet power supply circuitry further includes a switch device responsive to said tablet microcontroller and to the presence of an external electrical power supply for selectively controlling the application of voltage derived from said external power supply to said tablet battery.

8. A computer system according to claim 6 wherein said holster power manager further includes a switch device responsive to said holster microcontroller for selectively controlling the application of voltage derived from said tablet battery to said peripheral battery.

9. A computer system according to claim 6 wherein said holster peripheral is a radio transceiver.

10. A computer system comprising:

a tablet;

a tablet power supply having a tablet battery and circuitry controlling battery charging and discharging, said circuitry including a tablet microcontroller and a first switch device responsive to said tablet microcontroller and to the presence of an external electrical power supply for selectively controlling the application of voltage derived from said external power supply to said tablet battery;

a holster coupleable with said tablet;

a holster power manager having circuitry controlling electrical power distribution, said circuitry including a holster microcontroller and a second switch device responsive to said holster microcontroller for selectively controlling the application of voltage derived from said tablet battery to said peripheral battery;

said tablet microcontroller and said holster microcontroller communicating one with the other and cooperating in controlling electrical power and load distribution while said tablet and said holster are coupled;

a radio transceiver peripheral coupleable with said holster; and a radio transceiver peripheral power supply having a peripheral battery and monitor circuitry monitoring the state of said peripheral battery; said holster microcontroller communicating with said monitoring circuitry while said holster and said radio transceiver peripheral are coupled and deriving from said monitor circuitry while coupled thereto an input indicative of characteristics of the peripheral battery: and microcontroller logic, operative in said host and holster microcontroller, to control power flow among the host, holster and holster peripheral in accordance with said characteristics.

* * * * *